March 15, 1966     H. R. SHARP     3,240,064
LIQUID LEVEL GAUGE FOR FROZEN EARTH STORAGE TANK
Filed Oct. 20, 1964
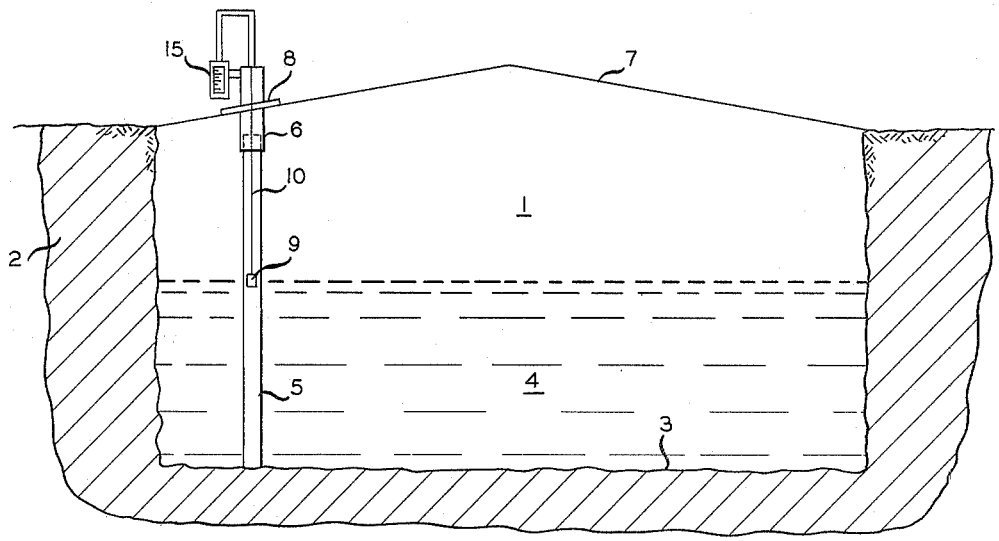
FIG. 1
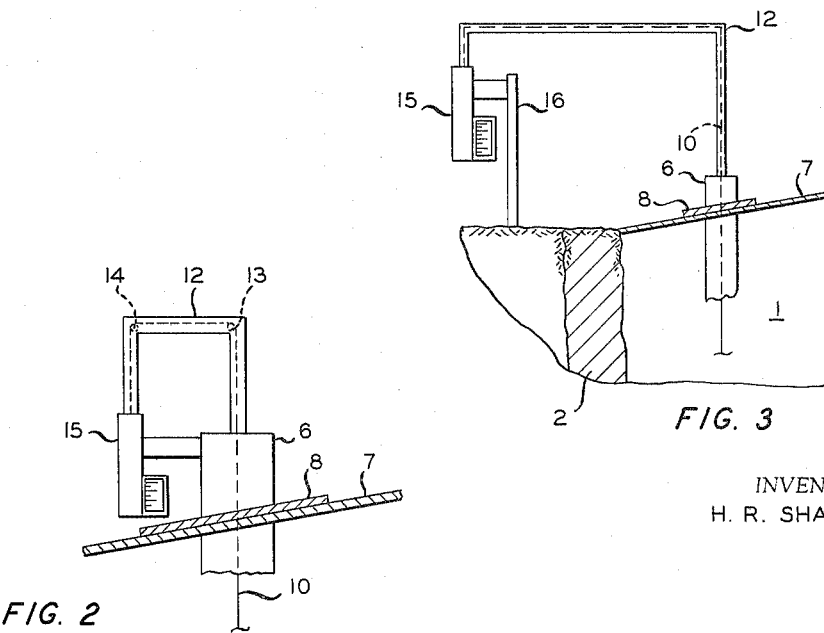
FIG. 2
FIG. 3
INVENTOR.
H. R. SHARP United States Patent Office 3,240,064
Patented Mar. 15, 1966

3,240,064
LIQUID LEVEL GAUGE FOR FROZEN EARTH
STORAGE TANK
Howard R. Sharp, Bartlesville, Okla., assignor to Phillips
Petroleum Company, a corporation of Delaware
Filed Oct. 20, 1964, Ser. No. 405,133
4 Claims. (Cl. 73—321)

This invention relates to frozen earth storage tanks. In one of its aspects it relates to a liquid level gauge for a frozen earth storage tank comprising two vertical conduits arranged in telescoping relationship and perforated to allow fluid to pass therethrough, one conduit being attached to the bottom of the storage tank and the other conduit being attached to the top of the storage tank, and a liquid level gauge operatively positioned in the telescoping tubes. In another of its aspects, the invention relates to a frozen earth storage tank comprising two vertical telescoping conduits providing a measuring chamber, a float positioned in said telescoping conduits, and a means for transferring the displacement of the float in the conduits to an automatic gauge which automatically relates the position of the float to a visible gauge reading. In a more specific aspect the automatic gauge is located in a fixed position in the ground outside of the storage tank.

A frozen earth storage tank requires a liquid gauge to indicate the content of liquid within the storage tank. It is known that the frozen bottom of a storage tank can heave upwardly and the roof of a storage tank can shift upwardly or downwardly. Therefore, a conduit attached to either the roof or the floor of the storage tank could cause damage if such movement occurred. A further problem with frozen earth storage tanks is that accessibility to the inside is virtually impossible once the tank has been put into operation. Thus, a liquid level gauge used in a frozen earth storage tank must be easily removable and replacable from the outside of the storage tank. I have now discovered that a liquid level gauge can be provided for a frozen earth storage tank if a telescoping housing is provided. This type of housing allows for movement of the roof and the floor and permits easy accessibility to the gauge.

It is therefore an object of this invention to provide a liquid level gauge for a frozen earth storage tank. It is a further object of this invention to provide a means for measuring the amount of liquid in a frozen earth storage tank. It is a still further object of this invention to provide an easily accessible liquid level gauge for a frozen earth storage tank.

Other aspects, objects, and the several advantages of this invention are apparent to one skilled in the art from a study of this disclosure, drawings, and the appended claims.

According to the invention there is provided in a frozen earth storage tank, a telescoping conduit, one member of which is attached and anchored to the frozen bottom of the storage tank, the other member of which is attached to the top of the storage tank. A liquid float member can be provided within the conduit, and a wire or metal tape can be provided to relate the position of the float member in the conduit to a gauging device.

The invention can be best understood by reference to the accompanying drawings. FIGURE I is a schematic showing the invention in a frozen earth storage tank. FIGURE II is a detailed view of the top portion of the storage tank of FIGURE I. FIGURE III is an embodiment of the invention showing an alternate means of measuring the liquid level.

Referring now to FIGURES I and II, a frozen earth storage tank 1 has frozen walls 2 and frozen bottom floor 3. A roof 7 is attached to the earth at the top of the storage tank. According to the invention, there is provided a perforated tube 5 which is anchored to the frozen floor of the earth storage tank, and a conduit 6 which is slightly larger in diameter than conduit 5 and telescopes over conduit 5. A float 9 with wire 10 is positioned within the telescoping conduit and wire 10 extends upwardly through the top of conduit 6 which is attached to roof 7 at plate 8. Wire 10 passes through pipe 12 which supports pulleys 13 and 14 which guide wire 10. Wire 10 then passes into automatic tank gauge 15 which translates the movement of wire 10 into changes in a calibrated depth reading on the gauge. Automatic tank gauge 15 can be any kind of well-known gauge which translates the position of the wire and hence float 9 into a reading on a scale.

Referring now to FIGURE III, there is provided a post 16 which is securely fastened in the ground outside of the area of the frozen earth storage. Automatic tank gauge 15 is fastened on post 16. Wire 10 passes upwardly through conduit 6 and into pipe 12 which has similar pulleys as shown in FIGURE II and into automatic gauge 15. With this embodiment of the invention movement of roof 7 without any change in the liquid level will not change the gauge reading on gauge 15. In operation, float 9 floats on liquid in conduits 5 and 6, such liquid being at a level as that in storage zone 1. Wire 10 is held in a taut position and any movement in float 9 is transferred through wire 10 into gauge 15, which visibly records the depth of liquid in the storage zone or the amount of liquid in the storage zone.

Reasonable variation and modification are possible within the scope of the foregoing disclosure, the drawings and the claims to the invention, the essence of which is that a liquid gauging device for a frozen earth storage tank is provided, said device comprising a telescoping conduit, one end of which is attached to the top of the frozen earth storage tank and one end of which is attached to the frozen bottom of the storage tank, a float positioned within said telescoping conduit and a means for transmitting the position of the float to an automatic gauging device.

I claim:

1. A liquid gauging device for a frozen earth storage tank having a substantially stationary roof comprising a first vertical tube anchored to the bottom of said storage tank, said first vertical tube containing a plurality of openings to allow liquid to flow from said storage tank into said first vertical tube and an open upper end extending to a point below the top of said roof, a second vertical tube attached to the top of said storage tank and being positioned so that said second vertical tube is telescopically positioned with respect to the first vertical tube so that the upper end of said first tube does not extend higher than the upper end of said second tube and a float operated gauge, the float being positioned within said telescoping tubes, said gauge being attached to the roof of said storage tank.

2. In a frozen earth storage tank comprising frozen walls, frozen floor, and a substantially stationary roof, the improvement which comprises a first vertical tube anchored to said floor, said first tube having an upper end which extends to a point below said roof, a second vertical tube attached to said roof and being telescopically engaged with said first vertical tube anchored in said floor, and a float operated gauge within said tubes, said gauge having a float member within said first and second vertical tubes, said gauge located outside of said storage tank, and means connecting said float with said gauge for transmitting the level of liquid in said storage tank to said gauge.

3. A liquid gauging device according to claim 1 wherein said float operated gauge comprises a means for transmitting the position of the float to a reading on the gauge.

4. A frozen earth storage according to claim 2 wherein said gauge is positioned outside of the frozen earth storage tank on a support which is out of contact with said storage tank.

References Cited by the Examiner

UNITED STATES PATENTS

| | | | |
|---|---|---|---|
| 1,982,970 | 12/1934 | Star | 73—321 |
| 2,144,113 | 1/1939 | Jurs | 73—321 |
| 2,237,461 | 4/1941 | Tokheim | 73—321 X |
| 2,942,468 | 6/1960 | Leduc | 73—321 |

FOREIGN PATENTS 18,514   8/1929   Australia.

ISAAC LISANN, *Primary Examiner*.